UNITED STATES PATENT OFFICE 2,099,826

INSECTICIDE

Paul S. Schaffer and Herbert L. J. Haller, Washington, D. C., dedicated to the free use of the People of the United States of America No Drawing. Application July 22, 1937, Serial No. 155,024

2 Claims. (Cl. 167—33)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to us of any royalty thereon.

We hereby dedicate the invention herein described to the free use of the People of the United States of America to take effect on the granting of a patent to us.

Our invention relates to improvements in materials for destroying or checking the growth or multiplication of living organisms, whether plant or animal, which are economically injurious to man.

An object of the invention is to provide a material suitable for use as an insecticide.

Another object of the invention is to provide a material which is relatively non-toxic to man and domestic animals when taken by mouth and which can be used in place of lead arsenate and other arsenicals for destroying insects without leaving a harmful residue on fruits and vegetables.

We have found that organic compounds made by condensing ketones such as acetone and secondary aromatic amines devoid of primary amino groups, are effective in killing many species of insects whether applied externally or internally; that these organic products may be sprayed or dusted upon delicate vegetation without injuring it. Suitable products according to this invention are dialkyl acridans and their derivatives of the formula

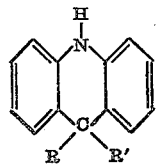

where R and R' are alkyl radicals of the general formula $C_nH_{2n+1}$, such as $CH_3$, $C_2H_5$, $(CH_3)_2CH$, etc.

One of the preferred compounds comprised in our invention is dimethylacridan. It is insoluble in water but soluble in organic solvents. The compounds may be reduced to impalpable powder by grinding and applied to vegetation either dry as a dust or wet as a spray. The compound being soluble in refined mineral oils, may be applied as a component of an oil emulsion spray. Dimethylacridan may also be applied by dissolving it in acetone and pouring the acetone into water whereupon a fine colloidal precipitate is formed. This may be applied directly to plants or it may be combined with a suitable wetting agent and then sprayed.

The value of dimethylacridan as an insecticide is shown by the following tests:

1. Upon mosquito larvae in aqueous solution in a concentration of 10 parts per million the mortality after 16 hours was 93%.
2. Upon cross-striped cabbage worm as a dust in a concentration of 70 mg. per sq. cm. of foliage the mortality after 72 hrs. was 100%.
3. Upon cabbage webworm as a dust in a concentration of 75 mg. per sq. cm. of foliage the mortality after 72 hrs. was 67%.
4. Upon the cabbage looper as a dust in a concentration of 75 mg. per sq. cm. of foliage, the mortality after 72 hrs. was 100%.

Having thus described our invention, what we claim for Letters Patent is:

1. An insecticide containing as its essential active ingredient a dialkylacridan.
2. An insecticide containing as its essential active ingredient dimethylacridan.

PAUL S. SCHAFFER.
HERBERT L. J. HALLER.